(12) United States Patent
Doerr

(10) Patent No.: US 8,938,137 B2
(45) Date of Patent: Jan. 20, 2015

(54) OPTICAL FILTER OR MULTIPLEXER/DEMULTIPLEXER

(75) Inventor: Christopher Doerr, Middletown, NJ (US)

(73) Assignee: Alcatel Lucent, Boulogne Billancourt (FR)

( * ) Notice: Subject to any disclaimer, the term of this patent is extended or adjusted under 35 U.S.C. 154(b) by 122 days.

(21) Appl. No.: 13/637,830

(22) PCT Filed: Mar. 18, 2011

(86) PCT No.: PCT/EP2011/054154
§ 371 (c)(1),
(2), (4) Date: Jan. 8, 2013

(87) PCT Pub. No.: WO2011/120827
PCT Pub. Date: Oct. 6, 2011

(65) Prior Publication Data
US 2013/0101249 A1   Apr. 25, 2013

(30) Foreign Application Priority Data

Mar. 31, 2010  (EP) ..................................... 10305335

(51) Int. Cl.
*G02B 6/12*   (2006.01)
*G02B 6/10*   (2006.01)
*G02B 6/293*  (2006.01)

(52) U.S. Cl.
CPC .............. *G02B 6/12* (2013.01); *G02B 6/12011* (2013.01); *G02B 6/10* (2013.01); G02B 6/29352 (2013.01); G02B 6/29398 (2013.01)

USPC ............................................................. 385/14

(58) Field of Classification Search
None
See application file for complete search history.

(56) References Cited

U.S. PATENT DOCUMENTS

| 4,781,424 A * | 11/1988 | Kawachi et al. ............... 385/132 |
| 6,393,185 B1 * | 5/2002 | Deacon ........................... 385/50 |
| 8,457,453 B2 * | 6/2013 | Lipson et al. .................... 385/14 |
| 2002/0154846 A1 | 10/2002 | Nolan et al. |
| 2006/0188193 A1 * | 8/2006 | Lenzi ............................... 385/14 |

FOREIGN PATENT DOCUMENTS

| EP | 1640754 A1 | 3/2006 |
| JP | H 07-281041 | 10/1995 |
| JP | H 10-332957 | 12/1998 |
| JP | 2011-180421 | 9/2011 |
| JP | 2013-507660 | 3/2013 |

OTHER PUBLICATIONS

International Search Report PCT/ISA/210 for International Application No. PCT/EP/2011/054154 dated Jun. 21, 2011.

* cited by examiner

*Primary Examiner* — Sung Pak
(74) *Attorney, Agent, or Firm* — Harness, Dickey & Pierce

(57) ABSTRACT

An optical filter or multiplexer/demultiplexer, including a plurality of optical waveguides forming a planar structure. Each optical waveguide has a total length including one or more first segments with a first width and at least one or more second segments with a second width, the first width being larger than the second width. The sum of lengths of the one or more first segments in each optical waveguide is larger than half the total length of the waveguide.

10 Claims, 2 Drawing Sheets

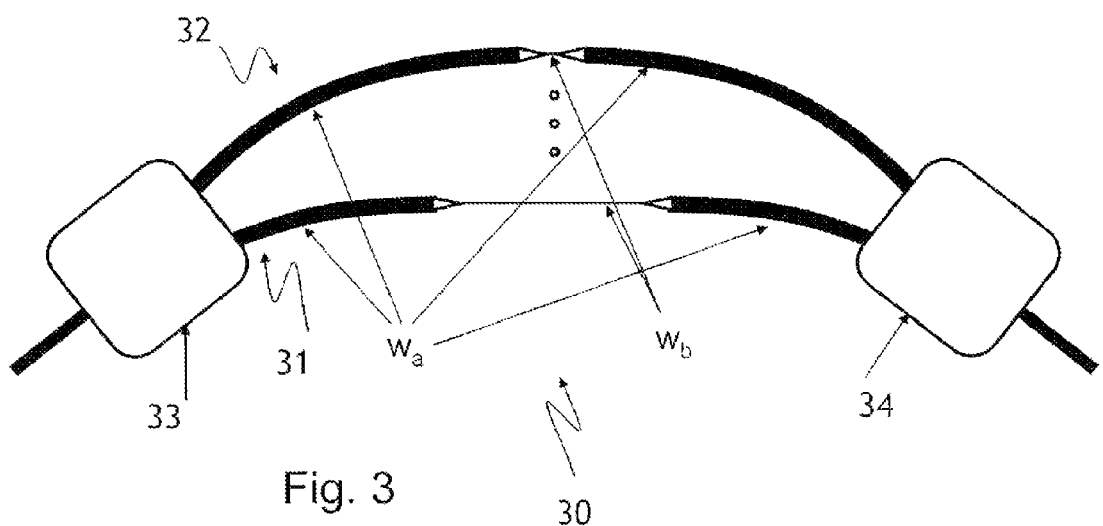

OPTICAL FILTER OR MULTIPLEXER/DEMULTIPLEXER

This application claims the benefit of European patent application No. 10305335.1, filed Mar. 31, 2010 and claims the benefit of PCT patent application No. PCT/EP2011/054154, filed Mar. 18, 2011, the respective contents of which are hereby incorporated by reference in their entirety.

The present invention relates to optical filters and optical multiplexer/demultiplexers and in particular to optical filters and multiplexer/demultiplexers made in photonic integrated circuits (PICs).

BACKGROUND ART

It is known that certain materials such as silicon, silicon-nitride and indium phosphide have a significant thermo-optic coefficient. This means that the index of refraction of the material changes with a change in temperature. If a filter is constructed using such material, the filter spectrum will typically shift in wavelength as the temperature changes. This thermo-optic coefficient is about 0.1 nm/° C. for silicon, about 0.02 nm/° C. for silicon-nitride, and about 0.1 nm/° C. for indium phosphide.

SUMMARY

This temperature dependency of the index of refraction, which is typically undesirable, often requires that the optical device, for example a PIC, be temperature controlled. However, such temperature control is typically expensive in terms of cost as well as power consumption.

Embodiments of the invention aim at providing an optical device comprising:
 a plurality of optical waveguides forming a planar structure, each optical waveguide having a total length; wherein at least one optical waveguide comprises one or more first segments and at least one or more second segments;
 wherein in said at least one optical waveguide each first segment has a first width and each second segment has a second width and the first width is larger than the second width; and
 wherein a sum of lengths of the one or more second segments in said at least one optical waveguide is shorter than half the total length of the waveguide.

According to some specific embodiments a total length of the second segments in at least one waveguide is less than about 500 times of a wavelength of an optical signal travelling within said at least one waveguide.

According to some specific embodiments a total length of the second segments in at least one waveguide is less than about 100 times of a wavelength of an optical signal travelling within said at least one waveguide.

According to some specific embodiments, at least one waveguide has no second segment.

According to some specific embodiments the sum of lengths of the one or more first segments in each optical waveguide is larger than 75% of the total length of the waveguide.

According to a specific embodiment, at least one optical waveguide has one or more third segments, the third segments having a third width smaller than the first width and different from the first width and the second width.

According to some specific embodiments, a total length of the first segments and the total length of the second segments vary from one waveguide to a successive waveguide according to the following relationships:

$$|\Delta L_a| = \frac{\Delta L_{eff(i)} * \frac{dn_b}{dT}}{n_a \frac{dn_b}{dT} - n_b \frac{dn_a}{dT}}$$

$$|\Delta L_b| = \frac{\Delta L_{eff(i)} * \frac{dn_a}{dT}}{n_a \frac{dn_b}{dT} - n_b \frac{dn_a}{dT}}$$

where $\Delta L_{eff(i)}$ is an effective optical path length difference between the two successive waveguides, $n_a$ and $n_b$ are indices of refraction of the first segments and the second segments respectively, T is the temperature, $|\Delta L_a|$ is an absolute value of a difference in the total length of the first segments between the two successive waveguides and $|\Delta L_b|$ is an absolute value the difference in the total length of the second segments between the same successive waveguides.

According to some specific embodiments a ratio between a first product and a second product is between 0.8 and 1.2, wherein the first product is obtained from the following formula:

$$\frac{dn_a}{dT} * |\Delta L_a|$$

wherein $n_a$ is the index of refraction of the one or more first segments, T is the temperature and $|\Delta L_a|$ is an absolute value of a difference in the total length of the first segments between the two successive waveguides; and the second product is obtained from the following formula:

$$\frac{dn_b}{dT} * |\Delta L_b|$$

wherein $n_b$ is the index of refraction of the one or more second segments, T is the temperature and $|\Delta L_b|$ is an absolute value the difference in the total length of the second segments between the same successive waveguides.

According to some embodiments, the optical filter or multiplexer/demultiplexer is an arrayed waveguide grating or an interferometer, for example a Mach-Zehnder interferometer.

According to some embodiments, there is provided a photonic integrated circuit comprising the optical filter or the optical multiplexer/demultiplexer as featured herein.

According to some embodiments, there is provided an optical equipment, comprising the optical filter or the optical multiplexer/demultiplexer or the photonic integrated circuit as featured herein.

BRIEF DESCRIPTION OF THE DRAWINGS

FIG. 3 is an exemplary schematic representation of an optical filter or multiplexer/demultiplexer according to some embodiments.

DETAILED DESCRIPTION

In order to better understand the solutions provided by the embodiments of the present invention, a brief reference to some known solutions is considered appropriate.

Figure 1:
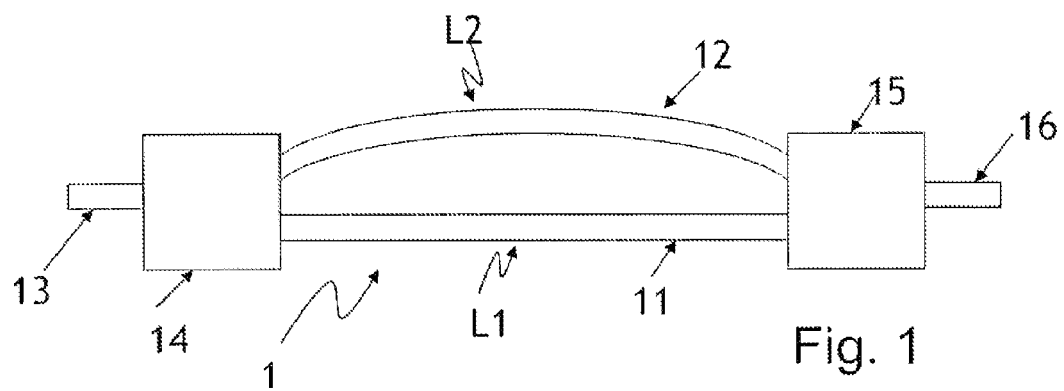
FIG. 1 is an exemplary schematic representation of a conventional interferometer.

FIG. 1 is an exemplary schematic representation of a conventional interferometer, for example a Mach-Zehnder interferometer.

The interferometer 1 of FIG. 1 comprises a first arm 11 having a first length and a second arm 12 having a second length, an input port 13 for receiving an incoming light beam, a light splitter 14 for splitting the incoming light into two components where each component is directed into an arm 11 or 12. Arms 11 and 12 are waveguides and have different lengths. However, arms 11 and 12 have the same width and therefore the same effective index of refraction. The difference in length in the two arms 11, 12, causes a phase change in the light travelling through the arms 11 and 12. The terms arm and waveguide may be used interchangeably throughout the present specification, however they both refer to the same element.

Therefore, the light passing though waveguide 11 is subject to a phase change which is different from the light passing thorough the second waveguide 12. The two light beams are then input into a free space propagation region 15 and a light beam with the desired phase change in the wavelength is output thorough output 16.

However, in practice, the index of refraction of the waveguides change with a change in the temperature. As already mentioned above, for certain materials such as silicon, silicon-nitride or indium phosphide the coefficient of such temperature change is significant, therefore the corresponding change in the index of refraction may cause significant shift in the wavelength response of the interferometer. Assuming that dn/dT is a derivate value of the change of the index of refraction of the material with respect to temperature where n is the index of refraction, and $\Delta T$ is the change in temperature, the shift $\Delta\lambda$ in the wavelength $\lambda$ of the peak transmissivity of the interferometer, may be expressed by:

$$\Delta\lambda = \frac{\frac{dn}{dT}*\Delta T}{n}*\lambda$$

In order to avoid such errors in performance, the device often needs to be temperature controlled during operation, consuming significant energy.

Existing attempts towards solutions for controlling the temperature of silicon-based devices typically require control circuitry which is complex and electrical power consumption which is costly. There are also some solutions suggesting the use of additional materials, such as polymers, which have a negative thermooptic coefficient, to try to reduce or eliminate the change in the index of refraction of the material with temperature (see, for example, K. Kashiwagi, et al., "Temperature insensitive silicon slot waveguides with air slot," ECIO, paper FrD4, 2008).

Figure 2:
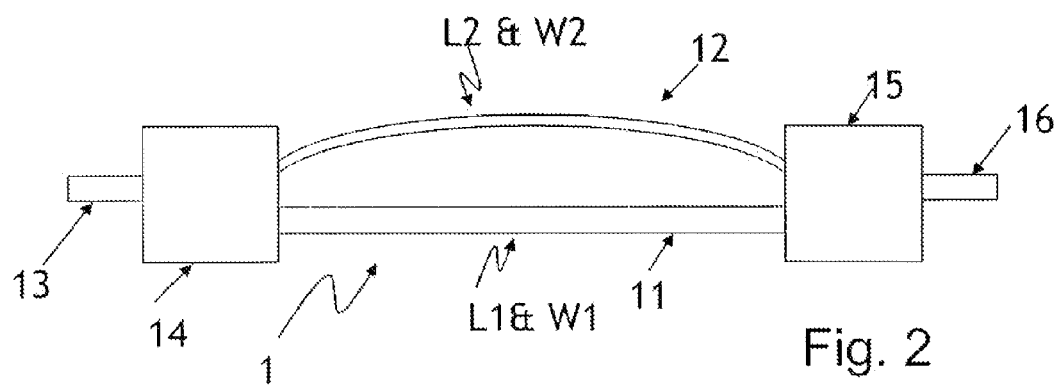
FIG. 2 is an exemplary schematic representation of an interferometer made according to a known solution.

Referring now to FIG. 2, there is shown an exemplary schematic representation of an interferometer according to some known solutions. In this example, a Mach-Zehnder interferometer is shown. In FIG. 2 like elements have been given like reference numerals as those of FIG. 1.

The interferometer 1 of FIG. 2 comprises a first arm 11 having a first length $L_1$ and a second arm 12 having a second length $L_2$. Furthermore, in a similar fashion as described in relation to FIG. 1, the interferometer 1 has an input port 13 for receiving an incoming light beam, a light splitter 14 for splitting the incoming light into two components where each component is directed into an arm 11 or 12. After passing thought the waveguides 11 and 12, the two light beams are input into a free space propagation region 15 and a light beam with the desired phase change in the wavelength is output thorough output 16.

However, in the above-mentioned known solutions, waveguides 11 and 12 have different widths. In the figure, waveguide 11 is shown to have a respective width $W_1$ corresponding to the length $L_1$, whereas the waveguide 12 is shown to have a width $W_2$ corresponding to the length $L_2$.

Different widths in the waveguides give rise to different indices of refraction. Furthermore, as the index of refraction of the material changes with a change in temperature, so does the waveguide confinement, thereby a narrower waveguide, for example waveguide 12 in FIG. 2, has a larger dn/dT than a wider waveguide such as for example waveguide 11, even though it may have a smaller index of refraction n.

An effective optical path length of a waveguide $L_{eff}$ may be represented by the product of the index of refraction n and the physical length of the waveguide L. Therefore for the waveguide 11, $L_{eff1}=n_1*L_1$ and for waveguide 12, $L_{eff2}=n_2*L_2$. The difference between the effective optical path lengths of waveguide 11 and waveguide 12 may be expressed as: $\Delta L_{eff}=(n_1*L_1)-(n_2*L_2)$. However, taking account of the change in the optical path length caused by temperature variation, the difference between the effective optical path lengths of waveguide 11 and waveguide 12 may be expressed as:

$$\Delta L_{eff} = \left(n_1 + \frac{dn_1}{dT}\Delta T\right)*L_1 - \left(n_2 + \frac{dn_2}{dT}\Delta T\right)*L_2 \quad (1)$$

In order to make this difference independent of temperature (i.e. to make the device athermal) it is desired that the following equation approximately holds:

$$\frac{dn_1}{dT}*L_1 = \frac{dn_2}{dT}*L_2 \quad (2)$$

In equation 2 above, $\Delta T$ has been cancelled from both side. Solving equations (1) and (2) for $L_1$ and $L_2$ we obtain:

$$L_1 = \frac{\Delta L_{eff} * \frac{dn_2}{dT}}{n_1\frac{dn_2}{dT} - n_2\frac{dn_1}{dT}} \quad (3)$$

and $$L_2 = \frac{\Delta L_{eff} * \frac{dn_1}{dT}}{n_1\frac{dn_2}{dT} - n_2\frac{dn_1}{dT}} \quad (4)$$

Therefore for a given $\Delta L_{eff}$, which is predetermined for a specific application and specific wavelength or set of wavelengths to be filtered, multiplexed or demultiplexed, the lengths $L_1$ and $L_2$ should be each approximately determined as a function of the rate of change in the indices of refraction of the two waveguides as shown in equations 3 and 4 above. For example, $\Delta L_{eff}$ may be determined by a desired freespectral range of a filter or optical multiplexer/demultiplexer which is $c_0/\Delta L_{eff}$, where $c_0$ is the speed of light in vacuum.

Thus, as long as $n_2*(dn_1/dT) \neq n_1*(dn_2/dT)$, values for $L_1$ and $L_2$ can be found such that the filter or optical multiplexer/demultiplexer can operate independent of the temperature (athermal).

In order to determine the value of the lengths, it may be appropriate to determine the corresponding first and second indices of refraction. This is possible by determining the corresponding values for $W_1$ and $W_2$, the waveguide widths corresponding to waveguide having lengths $L_1$ and $L_2$ respectively, by using a mode solver, such as a finite-element mode solver, and calculating the effective index of the guided mode in a waveguide to find the index of refraction n and then changing the indices of refraction of the materials to simulate a change in temperature to find the change in n with temperature.

As a practical, non-limiting example, for a silicon waveguide of about 220 nm thickness, reasonable values for $W_1$ and W2 for a wavelength of about 1550 nm are $W_1$=0.4 µm and $W_2$=1.5 µm. In such a case, $L_1/(\Delta L_{eff}/n_2) \approx L_2/(\Delta L_{eff}/n_1) \approx 4.5$ which is a value may be calculated using a 2-dimensional finite-element mode solver for the waveguide cross section.

One approach is known from M. Uenuma and T. Moooka, "Temperature-independent silicon waveguide optical filter," Opt. Lett., vol. 34, pp. 599-601, 2009.

This basic concept of using waveguides of different width may be generalized to devices where there are more than only two waveguides available. One example of such device is an arrayed waveguide grating (AWG). In such a case, in a similar fashion as described above in relation to the two-waveguide interferometer of FIG. 2, a first width is determined which would correspond to a first index of refraction, and a second width is determined which would correspond to a second index of refraction. One such solution is known from M. Uenuma and T. Moooka, "Design of a temperature-independent arrayed waveguide grating on 301 substrates," Group IV Photonics, 2007 4th IEEE International Conference, September 2007.

In the above known solution it is observed, at least schematically from FIG. 1, that a majority of the lengths of the waveguides in the AWG is comprised of narrow waveguides and only certain parts (mostly straight-line parts) are waveguides having wider widths. However, such a design has certain drawbacks.

One drawback is related to the problem of reducing undesired effects of typically unavoidable fabrication errors in etching of the optical waveguides of the AWG. Such errors are due to limited tolerances and typically produce random variations in the widths of the segments of said waveguides. Such width errors are undesirable because they cause errors in the effective refractive indices of the waveguides.

The inventor has recognized that such fabrication errors have a more important impact on narrow segments of optical waveguides than on wide segments of optical waveguides, because refractive indices of narrower segments are typically more sensitive to the value of the width. For that reason, the inventor proposes embodiments in which more than ½ of the total length of each waveguide of the optical filter or multiplexer/demultiplexer is wide waveguide (in other words less than ½ of the total length of the waveguide is narrow waveguide) and preferably more than ¾ of the total length of each waveguide is wide waveguide. (in other words less than ¼ of the total length of the waveguide is narrow waveguide).

In some specific preferred embodiments the total length of the narrow segments in at least one waveguide in the interferometer is negligible (ideally about zero), more preferably less than about 100 wavelengths, and at least less than about 500 wavelengths. As some waveguides may have a finite length of the narrow waveguide segments, such criteria serve to minimize the total length of narrow waveguide segments in the entire optical filter or multiplexer/demultiplexer, while enabling a production of devices that are substantially insensitive to temperature changes.

This design has certain advantages, for example a device made based on the above design provides improvement in the operation of the device as compared to known devices, because an optical filter or multiplexer/demultiplexer with wide waveguides may have less phase error and thus has much better crosstalk and lower insertion loss.

Generally, the more the length of the narrow waveguides as compared to the length of the wide waveguide in one specific waveguide, the more difficult it may become for the optical filter or multiplexer/demultiplexer to operate appropriately. Furthermore the use of narrow waveguide for the portions of the waveguide that have bends (or curves) may cause increased radiation loss in the bends and increased scattering loss due to any roughness on the bend sidewalls.

FIG. 3 is an exemplary schematic representation of an optical filter or multiplexer/demultiplexer according to some embodiments. In the figure the basic structure of an arrayed waveguide grating (AWG) has been shown, however it is to be noted that the same principles as described herein in relation to the AWG of FIG. 3 may be applied to other optical filters or multiplexer/demultiplexers such as a Mach-Zehnder interferometer in which two or more waveguides are used.

In the AWG 30 of FIG. 3, each individual optical waveguide 31, 32 has one or more first segments with a first width $W_a$ and one or more second segments with a second narrower width $W_b$. In the figure, for simplification purposes, only one second narrow segment $W_b$ and only two first segments $W_a$ are shown. However this is only optional and the AWG may have any convenient number of first segments and second segments other than what is shown in the figure.

The first and second segments are end-connected via taper regions that preferably adiabatically change the width of the optical waveguide between the first width $W_a$ and the second width $W_b$. For example, the wider first segments may connect the corresponding optical waveguide of the AWG to planar free space regions 33 and 34, and the narrower second segment may be located between the wider first segments as shown in the figure. However, this is only optional and other configurations of the wide and narrow segments of the waveguides may also be employed within the scope of the present embodiments. In FIG. 3, for simplification of presentation, only two waveguides 31 and 32 have been shown. However, the AWG typically may have any convenient number of waveguides which are typically positioned successively, forming a planar arrayed waveguide grating. This is represented in the figure by dots between the lower 31 and the higher 32 waveguides.

As it is shown in this figure, successive optical waveguides in the AWG vary in total length.

Also, each or some of the successive optical waveguides in the AWG may have first segments of different total lengths and/or have second segments of different lengths.

Moving from the lower waveguide 31 to the higher one 32 in the figure, from one waveguide to a successive waveguide, as the total path length increases, it can be observed that the length of the second segments having narrower width $W_b$ decreases and the total length of the first segments having wider width $W_a$ increases. However, this is only exemplary, and other configuration of the successive waveguides may also be employed within the scope of the claimed invention.

In the exemplary representation of FIG. 3 it may be observed that the length of the segment having width $W_b$ in waveguide 32 is negligible (nearly zero), thus satisfying the criterion of maintaining the length of the narrow waveguides at a minimum. If the segment having width $W_b$ were to be longer in waveguide 32, the segment of width $W_b$ in waveguide 31 would have to be longer by the same amount. This would increase the length of segments $W_b$ in the filter or multiplexer demultiplexer, degrading its performance.

The first segments of width $W_a$ and the second segments of width $W_b$ have respective indices of refraction $n_a$ and $n_b$.

It is assumed that in one specific waveguide, say waveguide number "i" from a total number of k waveguides, the total physical length of the waveguide is represented by $L_i$, the first segments have a total length $L_{ai}$ and the second segments have a total length $L_{bi}$. In an adjacent waveguide, the total physical length of the waveguide, the total length of the first segments and the total length of the second segments are respectively different. For example in the waveguide number "i−1", the total physical length of the waveguide is represented $L_{i-1}$, the first segments have a total length $L_{a(i-1)}$ and the second segments have a total length $L_{b(i-1)}$.

It is assumed that the difference in the total length of the first segments between the two successive waveguides mentioned above is represented by $\Delta L_a$ ($|\Delta L_a|$ being absolute value) and the difference in the total length of the second segments between the same successive waveguides is represented by $\Delta L_b$ ($|L_b|$ being absolute value), Therefore, if the desired (and predetermined) effective optical path length difference between the above two successive waveguides is $\Delta L_{eff(i)}$, then following relationship holds:

$$\Delta L_{eff(i)} = \left(n_a + \frac{dn_a}{dT}\Delta T\right) * |\Delta L_a| - \left(n_b + \frac{dn_b}{dT}\Delta T\right) * |\Delta L_b| \quad (5)$$

In order to make this difference independent of temperature (athermal) it is desired that the following equation holds ($\Delta T$ being canceled from both sides):

$$\frac{dn_a}{dT} * |\Delta L_a| = \frac{dn_b}{dT} * |\Delta L_b| \quad (6)$$

It is to be noted that although equation 6 represents a mathematical equality, in practice a complete equality may not be needed in order to obtain an acceptable performance of the optical device. Assuming that P1 represent the product $$\frac{dn_a}{dT} * |\Delta L_a|$$

and P2 represents the product $$\frac{dn_b}{dT} * |\Delta L_b|$$

it may be considered that as long as the ratio between $P_1$ and $P_2$ is within an admissible range, the overall performance of the optical device may be acceptable. Preferred values for such admissible range may be ±20%, in other words the following relationship may be used as admissible range:

$$0.8 \leq P_1/P_2 \leq 1.20$$

Solving equations (5) and (6) for $|\Delta L_a|$ and $|\Delta L_b|$ (we find:

$$|\Delta L_a| = \frac{\Delta L_{eff(i)} * \frac{dn_b}{dT}}{n_a \frac{dn_b}{dT} - n_b \frac{dn_a}{dT}} \quad (7)$$

$$|\Delta L_b| = \frac{\Delta L_{eff(i)} * \frac{dn_a}{dT}}{n_a \frac{dn_b}{dT} - n_b \frac{dn_a}{dT}} \quad (8)$$

Equations 7 and 8 provide values for the waveguide-to-waveguide change, in this example waveguides number i and i−1, in the total physical lengths of the respective narrow and wide segments of the optical waveguides. According to relationships (7) and (8), the total physical lengths of the individual waveguides $L_i$ in the optical filter or multiplexer/demultiplexer may then be determined according to the following formula:

$$L_i = (k-i) * |\Delta L_a| + (i-1) * |\Delta L_b| \quad (9)$$

Where k is the total number of the waveguides in the optical filter or multiplexer/demultiplexer, and i is the sequential number of the waveguide in the sequence of waveguides on the structure on which the waveguides are formed. Here, the sequential number i varies from 1 to k.

As already explained above with respect to equation 6 that values of the products $P_1$ and $P_2$ may vary within an admissible range, it follows that equations 7, 8 and 9 may also be regarded to deviate from the complete equation to an admissible range, thus representing approximate values which may vary within said admissible range.

As already mentioned above, n and dn/dT may be calculated for each waveguide width using a numerical solver, such as a finite-element mode solver.

In this manner, an optical filter or multiplexer/demultiplexer may be constructed which is operable in a manner that is substantially independent of the change in temperature, allowing for such optical filters and multiplexer/demultiplexers to be made in silicon PICs without requiring any additional substantial processing steps or materials or any substantial electrical control or power consumption. The present solution avoids or substantially reduces the drawbacks related to the undesired effects of unavoidable fabrication errors in etching of the optical waveguides of the optical filter or multiplexer/demultiplexer which are typically due to limited tolerances and typically produce random variations in the widths of the segments of said waveguides.

According to some alternative embodiments, one or more optical waveguides of the optical filter or multiplexer/demultiplexer may comprise more than two waveguide widths. For example, one or more optical waveguides may have a third or more widths for certain length(s). As long as Eqs. (7) and (8) entirely or approximately (within an admissible range) hold for each adjacent waveguide pair having two respective segments with respective different widths, the resulting optical filter or multiplexer/demultiplexer should provide a significantly temperature-independent operation.

The various embodiments of the present invention may be combined as long as such combination is compatible and/or complimentary.

As already mentioned above, the optical filter or multiplexer/demultiplexer may be an arrayed waveguide grating or an interferometer, for example a Mach-Zehnder interferometer. It may also be possible that the optical filter or multiplexer/demultiplexer comprises a combination of an AWG and an interferometer.

It should be appreciated by those skilled in the art that any block diagrams herein represent conceptual views of illustrative circuitry embodying the principles of the invention.

The invention claimed is:

1. An optical device, comprising:
a plurality of optical waveguides forming a planar structure, each optical waveguide having a total length; wherein at least one optical waveguide comprises one or more first segments and at least one or more second segments;
wherein in said at least one optical waveguide each first segment has a first width and a first length and each second segment has a second width a second length and the first width is larger than the second width; and
wherein a sum of lengths of the one or more second segments in said at least one optical waveguide is shorter than half the total length of the waveguide; and wherein said sum of lengths of the one or more second segments in said at least one optical waveguide is less than about 500 times of a wavelength of an optical signal travelling within said at least one waveguide.

2. The optical device of claim 1 wherein a total length of the second segments in at least one waveguide is less than about 100 times of a wavelength of an optical signal travelling within said at least one waveguide.

3. The optical device of claim 1, wherein at least one waveguide has no second segment.

4. The optical device of claim 1, wherein the sum of lengths of the one or more first segments in each optical waveguide is larger than 75% of the total length of the waveguide.

5. The optical device of claim 1, wherein at least one optical waveguide has one or more third segments, the third segments having a third width smaller than the first width and different from the first width and the second width.

6. The optical device of claim 1, wherein said plurality of waveguides are positioned successively, forming said planar structure and wherein a total length of the first segments and the total length of the second segments vary from one waveguide to a successive waveguide according to the following relationships:

$$|\Delta L_a| = \frac{\Delta L_{eff(i)} * \frac{dn_b}{dT}}{n_a \frac{dn_b}{dT} - n_b \frac{dn_a}{dT}}$$

$$|\Delta L_b| = \frac{\Delta L_{eff(i)} * \frac{dn_a}{dT}}{n_a \frac{dn_b}{dT} - n_b \frac{dn_a}{dT}}$$

where $\Delta L_{eff(i)}$ is an effective optical path length difference between the two successive waveguides, $n_a$ and $n_b$ are indices of refraction of the first segments and the second segments respectively, T is the temperature, $|\Delta L_a|$ is an absolute value of a difference in the total length of the first segments between the two successive waveguides and $|\Delta L_b|$ is an absolute value the difference in the total length of the second segments between the same successive waveguides.

7. The optical device of claim 1, wherein said plurality of waveguides are positioned successively, forming said planar structure and wherein a ratio between a first product and a second product is between 0.8 and 1.2, wherein the first product is obtained from the following formula:

$$\frac{dn_a}{dT} * |\Delta L_a|$$

wherein $n_a$ is the index of refraction of the one or more first segments, T is the temperature, where $|\Delta L_a|$ is an absolute value of a difference in the total length of the first segments between the two successive waveguides; and
the second product is obtained from the following formula:

$$\frac{dn_b}{dT} * |\Delta L_b|$$

wherein $n_b$ is the index of refraction of the one or more second segments, $|\Delta L_b|$ is an absolute value the difference in the total length of the second segments between the same successive waveguides.

8. The optical device of claim 1, wherein the optical device is one of an optical filter and a multiplexer/demultiplexer,
the one of the optical filter and the multiplexer/demultiplexer being one of an arrayed waveguide grating and an interferometer.

9. A photonic integrated circuit comprising the optical device of claim 1, the optical device being one of an optical filter or an optical multiplexer/demultiplexer.

10. An optical equipment, comprising:
one of an optical filter, an optical multiplexer/demultiplexer, and a photonic integrated circuit, each of which includes the optical device of claim 1.

* * * * *